(12) United States Patent
Poe (10) Patent No.: US 12,086,286 B2
(45) Date of Patent: Sep. 10, 2024

(54) ANONYMIZATION PROTOCOLS (71) Applicant: Hewlett-Packard Development Company, L.P., Spring, TX (US)

(72) Inventor: Daryl T. Poe, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/768,885

(22) PCT Filed: Nov. 4, 2019

(86) PCT No.: PCT/US2019/059602
§ 371 (c)(1),
(2) Date: Apr. 14, 2022

(87) PCT Pub. No.: WO2021/091522
PCT Pub. Date: May 14, 2021

(65) Prior Publication Data
US 2024/0095400 A1    Mar. 21, 2024

(51) Int. Cl.
*G06F 21/62* (2013.01)
(52) U.S. Cl.
CPC .............................. *G06F 21/6254* (2013.01)
(58) Field of Classification Search
CPC .................................................. G06F 21/6254
See application file for complete search history.

(56) References Cited

U.S. PATENT DOCUMENTS

| 8,166,313 B2 | 4/2012 | Fedtke |
| 8,930,381 B2 | 1/2015 | Raghunathan et al. |
| 9,338,220 B1 | 5/2016 | Kothari et al. |
| 9,489,538 B2 | 11/2016 | Vyas et al. |
| 9,639,715 B2 | 5/2017 | Krogius |
| 10,204,227 B2 | 2/2019 | Nagasundaram et al. |
| 10,326,772 B2 | 6/2019 | Spertus et al. |
| 11,086,890 B1* | 8/2021 | Li .................. G06F 16/2465 |
| 11,816,321 B1* | 11/2023 | Li .................. G06F 3/04847 |
| 11,996,174 B2* | 5/2024 | DeRosa-Grund ................ G06Q 30/0645 |
| 11,997,203 B2* | 5/2024 | Nicol .................. H04L 9/0894 |
| 2004/0103426 A1* | 5/2004 | Ludvig .................. H04H 20/86 348/E7.071 |
| 2009/0282036 A1* | 11/2009 | Fedtke .................. G06F 21/6254 707/E17.135 |
| 2015/0373043 A1* | 12/2015 | Wang .................. G06F 21/6254 706/12 |
| 2016/0224804 A1* | 8/2016 | Carasso .................. G06F 16/2322 |
| 2017/0169252 A1 | 6/2017 | Ukena-Bonfig et al. |
| 2021/0073922 A1* | 3/2021 | Wang .................. G06N 20/00 |
| 2024/0006030 A1* | 1/2024 | Carey .................. G16H 40/63 |
| 2024/0038363 A1* | 2/2024 | Leitao .................. G16H 30/20 |
| 2024/0069752 A1* | 2/2024 | Erb .................. G06F 3/0622 |

(Continued)

FOREIGN PATENT DOCUMENTS

EP    1956512 A1    8/2008

*Primary Examiner* — Stephen T Gundry
(74) *Attorney, Agent, or Firm* — Quarles & Brady LLP (57) ABSTRACT

An example system may include a processor and a non-transitory machine-readable storage medium storing instructions executable by the processor to determine a type of data to be added to a log file; determine a selected anonymization protocol for the type of the data; and anonymize the data according to the anonymization protocol as the data is added to the log file.

13 Claims, 4 Drawing Sheets

(56) References Cited

U.S. PATENT DOCUMENTS

| | | | |
|---|---|---|---|
| 2024/0070322 A1* | 2/2024 | Bobde | G06F 21/6254 |
| 2024/0078253 A1* | 3/2024 | Hawco | G06N 7/01 |
| 2024/0135031 A1* | 4/2024 | Healy | G06F 21/6245 |
| 2024/0143829 A1* | 5/2024 | Fleck | G06F 21/6245 |
| 2024/0143838 A1* | 5/2024 | Ardhanari | G16H 30/40 |
| 2024/0154941 A1* | 5/2024 | Nagpal | H04L 63/18 |

* cited by examiner

ANONYMIZATION PROTOCOLS

BACKGROUND

A system log may include a file that contains events that are logged at a computing device. For example, a system log may include events logged by operating system components of the computing device. The events to be logged may be predetermined by the operating system itself. System logs may contain information about device changes, device drivers, system changes, events, operations, telemetry, etc. The system logs may constitute valuable data for analysis and/or diagnosis of system behavior. The system logs may be shared in order to conduct the analysis and/or diagnosis.

DETAILED DESCRIPTION

System logs may be utilized to analyze system behavior and/or diagnose system malfunctions or errors. System logs may include detailed logs of the activity occurring at a computing device. Typically, the more detailed the logged information, the more useful it may be in identifying the source of an issue.

System logs may include data such as usernames, IP addresses, passwords, activity logs, user behavior logs, and/or various other data that may be utilized to uniquely identify and/or profile users. As such, some of this data may be considered sensitive and/or private by users. However, in order to diagnose computing device and/or application issues, the logs may be transmitted to and/or analyzed by specialists. For example, the logs may be transmitted to an information technology (IT) department within an institution, to a third-party IT organization, to a third-party data analysis organization, etc. As such, a user may be transmitting their sensitive data to remote computing devices, parties, and/or locations that are outside of their control. This may introduce concerns for a user regarding how their data is being handled and/or protected by these parties.

Further, individual users may have differing opinions regarding which data they deem sensitive and/or are comfortable transmitting in a log for analysis. However, the data included in the system logs may not reflect and/or conform to the opinions of the users regarding the handling of their data. Instead, the user may utilize a system log protocol that is over inclusive of their sensitive data in the data log or under inclusive of data that they do not consider sensitive data in the system log. This may lead to feelings of anxiety in the user and expose the user's sensitive data to exploitation on the one hand and/or may lead to system logs that do not include enough information to accurately and/or efficiently analyze and/or diagnose an issue at a computing device on the other hand.

In some examples, anonymization may be applied to the data in the system logs in order to ameliorate privacy concerns. However, the data is present in the system log in a non-anonymized format prior to anonymization. The presence of non-anonymized sensitive data in the system logs may create security concerns regarding securing the logs prior to the anonymization and/or during storage. Additional computational resources and increased costs may be involved in securing this data.

Further, anonymization of the sensitive data in the system logs may rely on pattern recognition techniques applied to the logs. For example, the system logs may be scanned for data having a particular format that matches a pre-defined format associated with sensitive data. In some examples, some sensitive data may be in a format that does not entirely match the pre-defined format and/or is missed by the scan. As such, this sensitive data may not be anonymized and may be transmitted, unbeknownst to a user, as part of the system log.

Furthermore, the anonymization protocols applicable to the data in the system logs may not be customizable by a user. As a result, the anonymization of the data in the system logs may not comport with the opinions of a user regarding what constitutes sensitive data. Therefore, the system log may be over inclusive of non-anonymized sensitive data in the data log or under inclusive of non-anonymized data that the user does not consider sensitive data.

In contrast, examples consistent with the present disclosure may include a system to anonymize data according to a user-configured anonymization protocol, applicable to a specific type of data, as the data is added to the system log. For example, the system may include a processor and a non-transitory machine-readable storage medium to store instructions executable by the processor to determine a type of data to be added to a log file, determine a selected anonymization protocol for the type of the data, and anonymize the data according to the anonymization protocol as the data is added to the log file.

Figure 1:
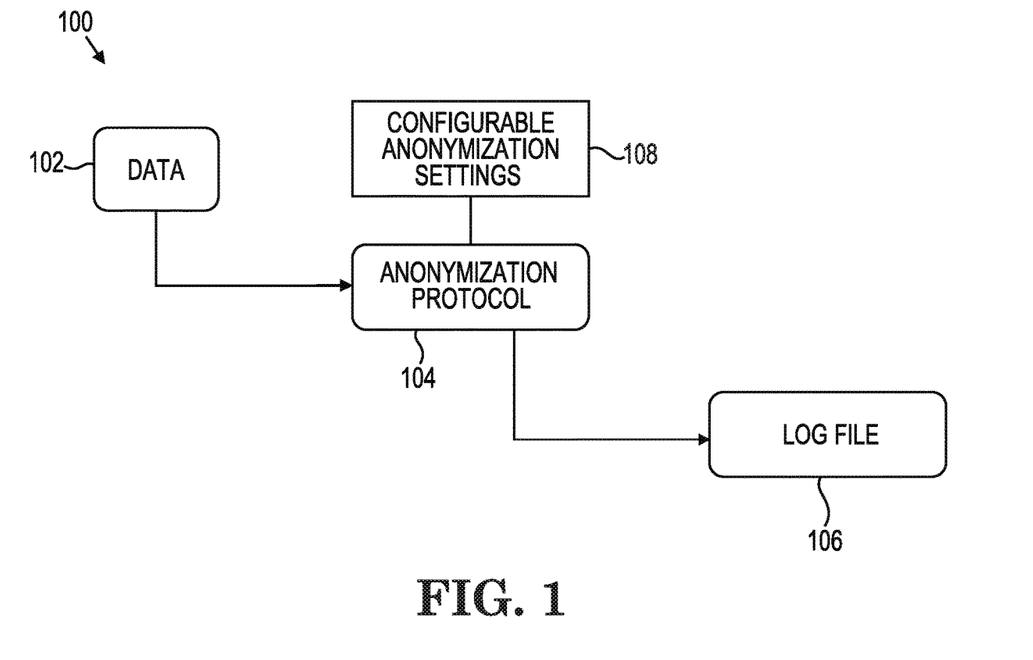
FIG. 1 illustrates an example of a system for utilizing anonymization protocols consistent with the present disclosure.

FIG. 1 illustrates an example of a system 100 for utilizing anonymization protocols consistent with the present disclosure. The described components and/or operations of the system 100 may include and/or be interchanged with the described components and/or operations described in relation to FIG. 2-FIG. 4.

The system 100 may include a computing device. For example, the system 100 may include a desktop computer, a notebook computer, a tablet computer, a thin client, a smartphone, a smart device, a wearable computing device, a smart consumer electronic device, a server, a virtual machine, a distributed computing platform, and Internet-of-things (IOT) device, etc. The computing device may include a processor and a non-transitory machine-readable storage medium. The machine-readable storage medium may store instructions. The instructions may be executable by the processor to perform the various functionalities described herein.

The system 100 may include a system log file 106 for a computing device. The log file 106 may be utilized to automatically collect, store, and/or communicate data 102 regarding device changes, device drivers, system changes, events, transactions, messages, operations, telemetry, etc. As used herein, "automatically" may include being collecting, storing, and/or communicating data with limited or no user input and/or with limited or no prompting. The log file 106 may be populated with such data as the computing system is operated. That is, the log file 106 may record data 102 regarding device changes, device drivers, system changes, events, transactions, messages, operations, telemetry, etc. that occur as an operating system (O/S) or other instructions are executed at the computing device. As used herein, a system log file may include a stand-alone file or record populated during runtime, an event log database local to the system 100, telemetry data transmitted in real-time or on delay for use by analysis programs elsewhere, etc. That is, a system log file may not be limited to a particular file, a particular file location, and/or a particular file type, but rather may be inclusive of a variety of data storage and/or communication mechanisms that may be utilized to compile, store, and/or communicate data 102.

The system 100 may be utilized to anonymize data 102 to be added to a log file 106 for the computing device. For example, a computing device may generate data 102 as it executes an O/S and/or other instructions. The data 102 may include potentially personally identifiable information generated during operation of the computing device. For example, the data 102 may include information that identifies a particular user or computing device and/or may be utilized to attribute activity to a particular user or computing device. In some examples, the data 102 may include a username, an internet protocol (IP) address, a domain name, a timestamp, a universally unique identifier (UUID), a credit card number, an age, a home address, a machine address, etc. Alternatively, the data 102 may be information that is not personally identifiable information.

The system 100 may be utilized to determine a type of the data 102. Determining the type of the data 102 may occur as the data 102 is generated and/or prior to the data 102 being added to the log file 106. The type of the data 102 may be determined from a data type tag associated with the data 102. For example, each piece of data 102 generated by executions at the computing device may be assigned a data type tag.

The data type tag that is to be assigned to data 102 may be determined by an originating application associated with the data 102. An application may include a software application including a set of instructions executable by the processor of the computing device to accomplish specific functionalities. An originating application may include an application whose instructions are executing when the data 102 is generated and/or are responsible for the generation of the data 102. The originating application may be encoded with instructions, coded by a developer, that identify and/or instruct what data type tag should be assigned to each unit of data 102 that is generated by the execution of the application.

In other examples, the data type tag that is to be assigned to data 102 may be determined by a supervising application. A supervising application may include instructions, separate from the instructions of the originating application, that are executable to analyze and assign a tag to data 102 produced by the originating application. The supervising application may be encoded with instructions, determined by analysis of the originating application and/or consultation with the developer of the originating application, that identify and/or instruct what data type tag should be assigned to each unit of data 102 that is generated by the execution of the originating application.

As such, the data 102 produced by execution of instructions at the computing device may be associated with a data type tag. In some examples, each piece of data 102 produced by the execution of the instructions at the computing device may be associated with a data type tag. In some examples, a portion of the data 102 produced by the execution of the instructions at the computing device may be associated with a data type tag. The data 102 may be assigned the data type tag regardless of the format of the data 102. Certain types of data 102 may be assigned a data tag, while other types of data 102 may not be assigned a data tag.

A data type tag may specify a type of the data 102. A type of the data 102 may include an identity, a category, a class, a label, etc. of the data 102. For example, the type of data may include a username data type, an IP address data type, a domain name data type, a timestamp data type, a QUID data type, a credit card number data type, an age data type, a home address data type, a machine address data type, a non-identifying data type, etc. These examples are not intended to be limiting examples, and various other data types may be utilized. The data type tag assigned to the data 102 may specify the data type of the data 102. The data tag assigned to the data 102 may specify the data type regardless of the format of the data 102.

The system 100 may utilize an anonymization protocol 104 to anonymize the data 102. An anonymization protocol 104 may include a set of instructions executable to anonymize the data 102 according to a particular protocol.

For example, an anonymization protocol 104 may include an as-is anonymization protocol. An as-is anonymization protocol may include a protocol that does not modify the data 102 as the data 102 is added to the log file 106. That is, the as-is anonymization protocol may include a protocol that does not actually anonymize the data 102 before as it is added to the log file 106. As such, the log file 106 may include the data 102 in a non-anonymized and/or native form once it is added to the log file 106. Data 102 that is processed according to the as-is anonymization protocol may include the greatest amount of information that may be utilized to analyze and/or detect system issues relative to the protocols described below. Data 102 that is processed according to the as-is anonymization protocol may include data that is not disguised and may include the full detail that it originally did when generated. That is, the data 102 may be passed verbatim to the log file 106.

For example, the data 102 may include the username "jonsmith." The "jonsmith" username may be saved to the log file 106 as "jonsmith." Again, "saving" to a log file, a used herein, may include more than just saving data to a particular file or storage location. For example, saving to a log file may also include depositing the data 102 into a stream of telemetry data to be transmitted to a remote computing device or service foe further analysis.

An anonymization protocol 104 may include a hashing anonymization protocol. A hashing anonymization protocol may include a protocol specifying that the data 102 should be run though a cryptographic hash function to generate a hash value. For example, the data 102 may be passed through a one-way hash. The hash value may be substituted for the data 102. The hash value may be added to the log file 106 in the place of the data 102. The hashing anonymization protocol may represent a level of anonymization that is more anonymous than the as-is anonymization protocol. Further, the hashing anonymization protocol may allow for recognition of data that might be personally identifiable without directly revealing the personally identifiable data.

For example, the data 102 may include the username "jonsmith". The "jonsmith" username may be passed through the hash to create a hash value of "146ecb91572c5330c7d750ed29811a38". The hash value "146ecb91572c5330c7d750ed29811a38" may be substituted for the "jonsmith" username and saved into the log file 106. Each time the username "jonsmith" appears in the log file 106 "jonsmith" may be substituted by the hash value of 146ecb91572c5330c7d750ed29811a38. As such, someone analyzing the log file 106 will be able to recognize that a same username is being utilized without knowing that the username was "jonsmith." However, someone could potentially construct a table and run through a list of known usernames and find the resulting hash associated with each username and map the hash value "146ecb91572c5330c7d750ed29811a38" backwards to the username "jonsmith." As such, utilizing the hashing anonymization protocol may be a more secure anonymization protocol 104 than an as-is anonymization protocol but still less secure than the other protocols described below.

An anonymization protocol 104 may include a tokenizing anonymization protocol. A tokenizing anonymization protocol may include a protocol specifying that the data 102 should be modified by replacing the data 102 with a randomized string that does not uniquely identify original content of the data 102. The randomized string may be a random string generated from the data 102. The randomized string may be added to the log file 106 in the place of the data 102. The tokenizing anonymization protocol may represent a level of anonymization that is more anonymous than the as-is anonymization protocol, and the hashing anonymization protocol. The tokenizing anonymization protocol may prevent recognition of data that might be personally identifiable but allow for the recognition of data patterns.

For example, the data 102 may include the username "jonsmith." The "jonsmith" username may be tokenized and replaced by the randomized string "USER-732YRX" in the log file 106. Someone analyzing the log file 106 may recognize that the same user with the username replaced by the randomized string "USER-732YRX" performed an action each time the randomized string "USER-732YRX" appears in the log file 106. However, the randomized string "USER-732YRX" may not be able to be mapped back to the username "jonsmith." As such, utilizing the tokenizing anonymization protocol may be a more secure anonymization protocol 104 than an as-is anonymization protocol and a hashing anonymization protocol, but still be less secure than the other protocols described below.

An anonymization protocol 104 may include a redaction anonymization protocol. A redaction anonymization protocol may include a protocol specifying that the data 102 should be redacted. The redaction anonymization protocol may include a protocol specifying that the data 102 should be placed with a constant string that does not uniquely identify original content of the data 102. The constant string may be added to the log file 106 in the place of the data 102. The redaction anonymization protocol may represent a level of anonymization that is more anonymous than the as-is anonymization protocol, the hashing anonymization protocol, and the tokenizing anonymization protocol. The redaction anonymization protocol may prevent recognition of data that might be personally identifiable and prevent the recognition of data patterns.

For example, the data 102 may include the username "jonsmith." The username "jonsmith" may be redacted and replaced with a constant string "USERNAME" in the log file 106. The constant string may not be a string produced from the data 102, but rather the constant string may be a string associated with the data type of the data 102. For example, since the username "jonsmith" is a username data type, it may be replaced with the "USERNAME" string. That is, regardless of the specific characters of the username in the data 102, the username may be redacted and replaced with the constant string "USERNAME." Therefore, someone analyzing the log file 106 may not be able to tell if a username appearing as the constant string "USERNAME" in the log file 106 is a same or different username than another instance of the constant string "USERNAME" in the log file 106. As such, utilizing the redaction anonymization protocol may be a more secure anonymization protocol 104 than an as-is anonymization protocol, a hashing anonymization protocol, and a tokenizing anonymization protocol.

A user and/or an administrator for a computing device may select which particular variety of anonymization protocol 104 is to be applied to a certain data type. For example, a user and/or administrator may select a particular anonymization protocol 104 to be assigned to a data type. For example, a user and/or administrator may configure configurable anonymization settings 108 to specify an anonymization protocol 104 assigned to each data type.

In this manner, a user may customize how their data 102 in anonymized for saving into the log file 106. The user may assign, on a data type by data type basis, which variety of anonymization protocol 104 should be applied to anonymize data 102 of the data type for incorporation to the log file 106. For example, a user and/or administrator may assign redaction anonymization protocol to a credit card number data type, tokenization anonymization protocol to a domain name data type, hashing anonymization protocol to a username data type, as-is anonymization protocol to a timestamp data type, etc. according to their opinions of the sensitivity of the data and/or its usefulness in diagnosing system issues balanced against their privacy concerns.

The system 100 may be utilized to determine a particular anonymization protocol 104 applicable to the data 102. The particular anonymization protocol 104 applicable to the data 102 may be determined based on the data type of the data 102 and the selected anonymization protocol 104 for that data type. For example, a data tag associated with the data 102 may be utilized to determine the data 102 and the anonymization protocol 104 selected for that data type may be determined by referencing the configurable anonymization settings 108 as configured by the user and/or administrator.

The system 100 may be utilized to anonymize the data 102 according to anonymization protocol 104 determined to have been selected for type of the data 102. The data 102 may be anonymized accordingly as the data is added to the log file 106. That is, the data may be anonymized between being generated and being added to the log file 106. As such, the data 102 may not be saved to and/or present in the log file 106 before being anonymized. The data 102 may not appear in the log file 106 until it has been subjected to the anonymization protocol. As such, security of the log file 106 may be comparatively less of a concern than a log file that may include the data in a non-anonymized form for a period of time.

Figure 2:
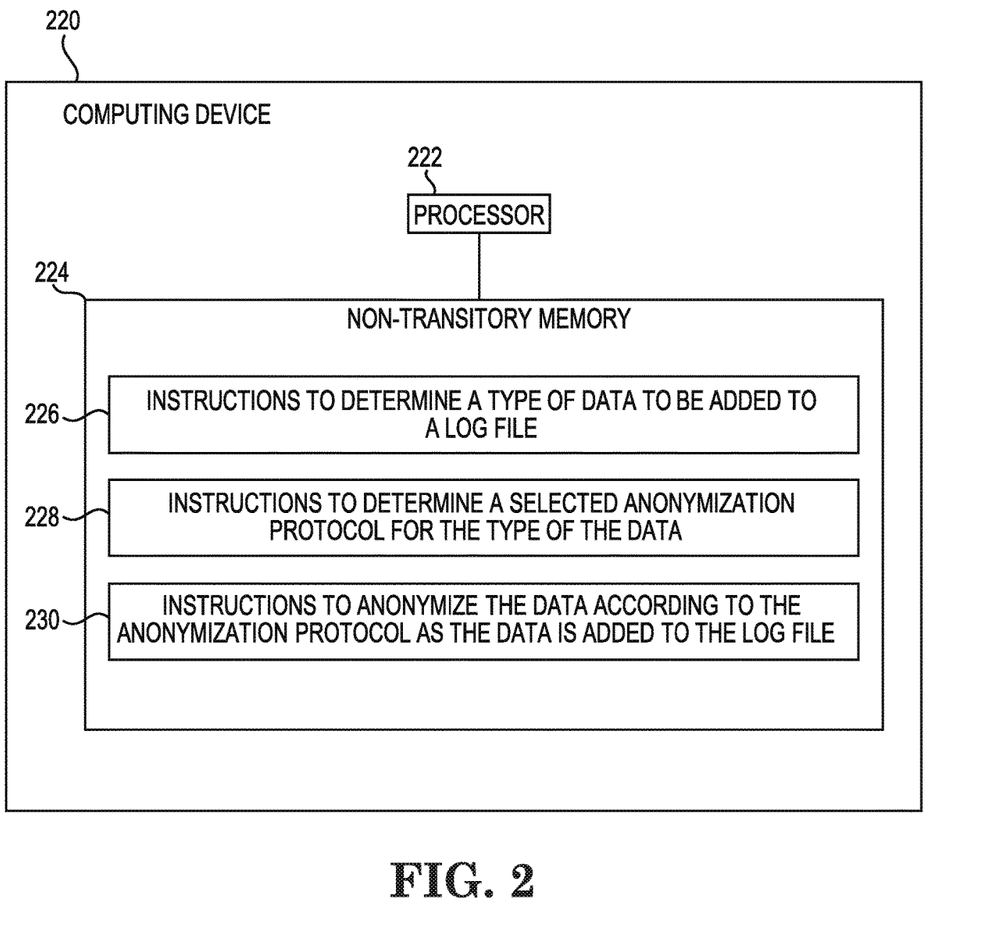
FIG. 2 illustrates an example of a computing device for utilizing anonymization protocols consistent with the present disclosure.

FIG. 2 illustrates an example of a computing device 220 for utilizing anonymization protocols consistent with the present disclosure. The described components and/or operations described with respect to the computing device 220 may include and/or be interchanged with the described components and/or operations described in relation to FIG. 1 and FIG. 3-FIG. 4.

The computing device 220 may include a desktop computer, a notebook computer, a tablet computer, a thin client, a smartphone, a smart device, a wearable computing device, a smart consumer electronic device, a server, a virtual machine, across a distributed computing platform, etc. The computing device 220 may include a processor 222 and a non-transitory memory 224. The non-transitory memory 224 may include a non-transitory machine-readable storage medium to store instructions (e.g., 226, 228, 238, etc.) that when executed by the processor 222, cause the computing device 220 to perform various operations described herein. While the computing device 220 is illustrated as a single component, it is contemplated that the computing device 220 may be distributed among and/or inclusive of a plurality of such components.

The computing device 220 may execute the instructions 226 to determine a type of data to be added to a log file. For example, the data may be analyzed to determine a type of the data. The type of the data may be determined by reading a tag associated with the data. The tag may specify the type of the data.

The tag may be assigned to the data by a developer of the originating application. The tag may be assigned to the data regardless of the format of the data. For example, even if the data does not have the traditional format of an IP address, if the developer of the originating application has designated the data as an IP address data type, then that is the tag it may be assigned.

The computing device 220 may execute the instructions 228 to determine a selected anonymization protocol for the type of the data. The selected anonymization protocol may be an anonymization protocol selected from a plurality of distinct anonymization protocols to be applied to data of a specific type.

Each of the plurality of anonymization protocols may provide a respective level of anonymization strength and/or data security. As such, a user may specify a customized data anonymization scheme for their computing device 220. The user may specify on a data type by data type basis what level of anonymization is appropriate for their data and select the corresponding anonymization protocol accordingly.

A list of particular anonymization protocols assigned to respective data types may be referenced in order to determine the particular anonymization protocol assigned to the data type of the data to be added to the log file.

The computing device 220 may execute the instructions 230 to anonymize the data to be added to the log file. The data may be anonymized according to the particular anonymization protocol determined to be assigned to the type of the data to be added to the log file. The data may be anonymized as the data is added to the log file. For example, the data may be anonymized as it is generated and before it is saved into the log file. The log file may not contain data that has not been anonymized according to its corresponding anonymization protocol.

Figure 3:
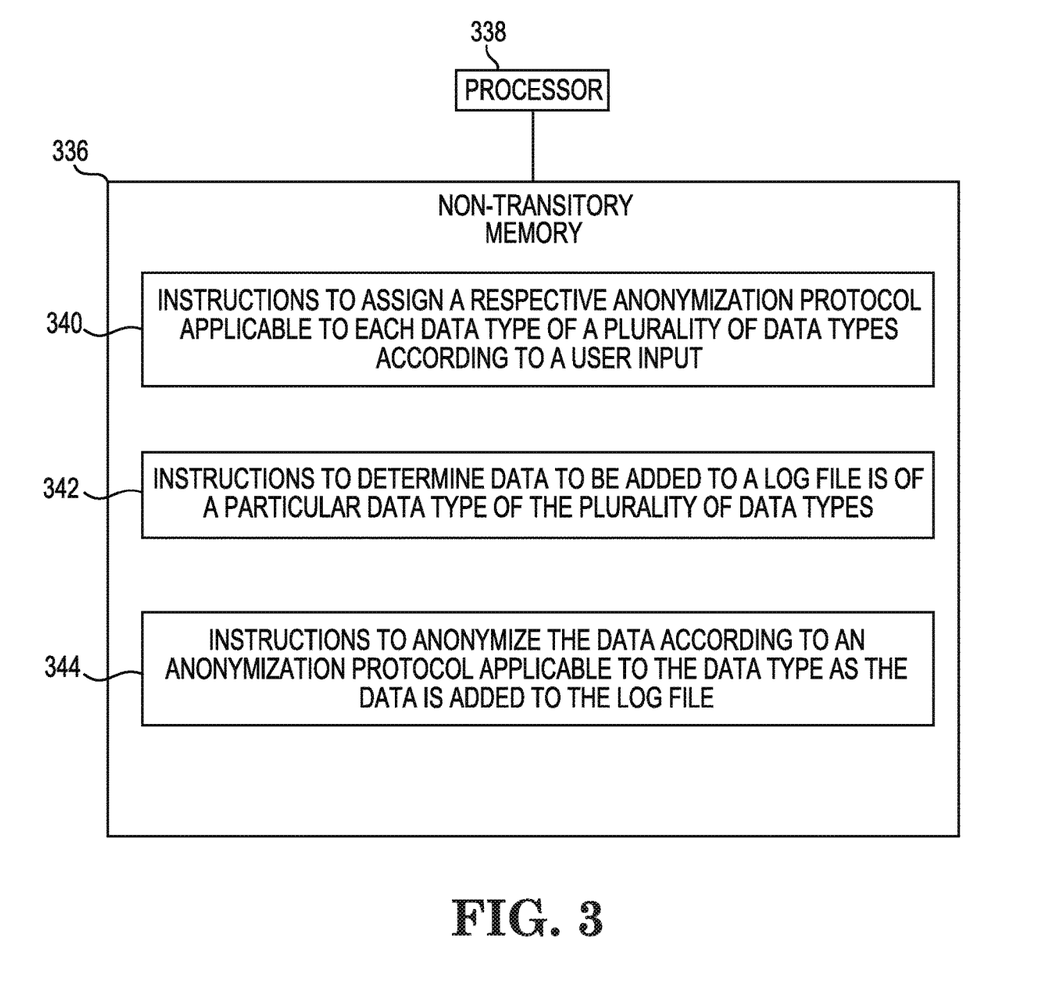
FIG. 3 illustrates an example of a non-transitory machine-readable memory and processor for utilizing anonymization protocols consistent with the present disclosure.

FIG. 3 illustrates an example of a non-transitory machine-readable memory and processor for utilizing anonymization protocols consistent with the present disclosure. A memory resource, such as the non-transitory machine-readable memory 336, may be utilized to store instructions (e.g., 340, 342, 344, etc.). The instructions may be executed by the processor 338 to perform the operations as described herein. The operations are not limited to a particular example described herein and may include and/or be interchanged with the described components and/or operations described in relation to FIG. 1-FIG. 2 and FIG. 4.

The non-transitory machine-readable memory 336 may store instructions 340 executable by the processor 338 to assign a respective anonymization protocol applicable to each data type of a plurality of data types. The assignment of anonymization protocols to data types may be based on user input.

The user input may include an anonymization protocol selected by the user to be assigned to a data type. For example, a user may be presented with a list of a plurality of data types. The plurality of data types may include the data types assignable to data generated by an application. The data types assignable to data generated by an application may be determined by an application developer associated with the application generating the data. In addition, the user may be presented with a list of a plurality of distinct anonymization protocols.

The user may select a particular anonymization protocol from the plurality of distinct anonymization protocols that is to be assigned to each particular data type. That is, a user may customize how particular data types will be anonymized for incorporation in a log file by selecting particular anonymization protocols to be assigned to particular data types. The user indicated correspondence between data types and anonymization protocols may be utilized as the user input forming the bases for the assignment of a respective anonymization protocol applicable to each data type of the plurality of data types.

The non-transitory machine-readable memory 336 may store instructions 342 executable by the processor 338 to determine data to be added to a log file is of a particular type of the plurality of data types. For example, an application may designate a data type associated with data generated by an execution of the application. For example, application developers may code their applications to assign data tags to data generated by their application. The data generated by the execution of an application may be tagged with a data type regardless of the format of the generated data.

The non-transitory machine-readable memory 336 may store instructions 344 executable by the processor 338 to anonymize the data to be added to the log file. The data may be anonymized by according to an anonymization protocol applicable to the data type of the data to be added to the log file. The data may be anonymized as the data is added to the log file. For example, the anonymized data resulting from the application of the anonymization protocol to the data may be added to the log file, but the non-anonymized form of the data may not be added to the log file. As such, the log file may remain free on non-anonymized sensitive data.

The customization of the assignment of anonymization protocols to data types may allow for data with different data types of be anonymized differently. As such, a user may achieve a very granular customization of anonymization protocol assignments that are tailored to their feelings and/or comfort level with exposing various data types.

For example, a second piece of data to be added to the log file may be determined to be of a second particular data type this is distinct from a first particular data type of a first piece of data. As such, the second piece of data may be anonymized, as it is added to the log file, according to a second anonymization protocol applicable to the second particular data type. The second anonymization protocol may utilize a distinct anonymizing mechanism from a first anonymization protocol applicable to the first piece of data. For example, the second anonymization protocol may include a hashing anonymization protocol, while the first anonymization protocol may include a redaction anonymization protocol.

Figure 4:
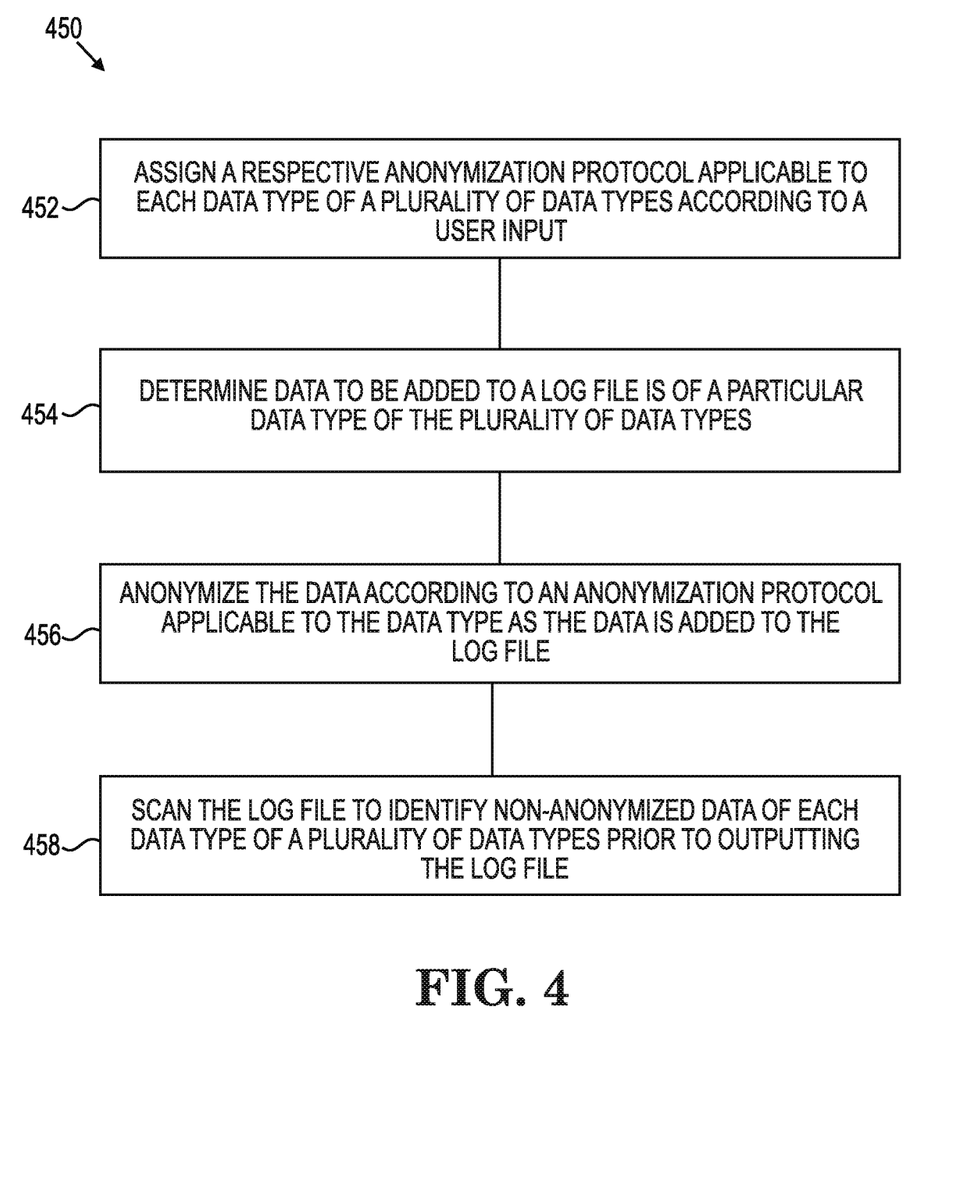
FIG. 4 illustrates an example of a method for utilizing anonymization protocols consistent with the present disclosure.

FIG. 4 illustrates an example of a method 450 for utilizing anonymization protocols consistent with the present disclosure. The described components and/or operations of method 450 may include and/or be interchanged with the described components and/or operations described in relation to FIG. 1-FIG. 3.

At 452, the method 450 may include assigning a respective anonymization protocol applicable to each data type of a plurality of data types. The anonymization protocol assigned to each data type may be based on user input. For example, a user may configure settings of an anonymization management application by selecting, for each data type of the plurality of data types, a corresponding anonymization protocol that they want to be applied to the data type in order to anonymize the data as it is added to a log file. The assignments between the anonymization protocols and the data types may be stored in a data structure.

A variety of anonymization protocols may be selectable by the user. For example, a variety of anonymization protocols that provide varying levels of anonymization, data security, and information within the log file may be selected from by the user. As such, rather than being forced to adhere to a one-size-fits-all blanket anonymization protocol, a user may be able to select a variety of anonymization protocols that provide a diverse range of levels of anonymization, data security, and information within the log file. This flexibility may produce contribute to a greatest amount of information being added to the log file while providing a user the precise level of data anonymization that they feel comfortable with.

At 454, the method 450 may include determining data to be added to a log file is of a particular type of data of the plurality of data types. For example, a data tag associated to the data to be added to the log file may be analyzed. The determined particular type of the data may be referenced against the data structure including the assignments between the anonymization protocols and the data types. By this analysis, an anonymization protocol applicable to the determined data type of the data may be determined.

At 456, the method 450 may include anonymizing the data as the data is added to the log file. The data may be anonymized according to the anonymization protocol determined to be applicable to the data type of the data. Anonymizing the data may include substituting the data with an anonymized version of the data that will be saved into the log file. The non-anonymized version may not be added to the log file.

At 458, the method 450 may include scanning the log file to identify non-anonymized data of each data type of a plurality of data types prior to outputting the log file. As described above, the data type tags associated with data may be generated by an originating application.

The developer of the originating application may be responsible for including the instructions in the originating application to create and associate the data type tags. However, an application developer may make errors that result in erroneous and/or missed data type tagging of data. Further, an application developer may not be a privacy expert and may simply lack the knowledge to incorporate instructions to create a set of data type tags that fully categorize distinct data types that a user may consider to be sensitive. As a result, some of the data that is an associated with an erroneous tag and/or is not associated with a tag may be added to the log file in a non-anonymized form despite being data that the user deems sensitive and wants to be anonymized.

Therefore, the log file may be scanned as a back-up mechanism to identify non-anonymized data that made it through the first line mechanism described above and was saved into the log file, but that the user wants to have anonymized. For example, the log file may be scanned as a post-processing function for the existence of certain patterns (e.g., data format, string matches, equivalents, etc.) in the log file.

For example, the log file may be scanned an a pattern of "[0-255].[0-255]. [0-255].[0-255]" may be recognized. Such a pattern may correspond to an IPV4 IP address. In such an example, the "[0-255].[0-255].[0-255].[0-255]" data may not have been associated with the IP address data type tag by the originating application. Regardless, the "[0-255].[0-255].[0-255].[0-255]" pattern may be recognized as belonging to the IP address data tag and the anonymization protocol selected by the user to apply to IP address data tags may be applied to anonymize the "[0-255].[0-255].[0-255].[0-255]" data in the log file. The non-anonymized "[0-255]. [0-255].[0-255].[0-255]" data may be excised from the log file and replaced with its anonymized version.

The post-processing scan may be performed after the data is added to the log file, but before the log file is output. That is, before the log file is transferred off the device for analysis, it may be subjected to the post-processing scan function described above. Responsive to a determination that the post-processing scan is complete and that the anonymization of any identified non-anonymized data is complete, the log file may be output to a remote computing device, an administrator, and/or other third party for analytic and/or diagnostic purposes.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure. Further, as used herein, "a plurality of" an element and/or feature can refer to more than one of such elements and/or features.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure and should not be taken in a limiting sense.

What is claimed:

1. A system, comprising:
   a processor; and
   a non-transitory machine-readable storage medium to store instructions executable by the processor to:
   determine a first type of first data to be added to a log file, wherein the first type of the first data is determined from a data type tag generated by an originating application and associated with the first data and wherein the first type is determined regardless of a format of the first data;
   determine a second type of second data to be added to the log file, wherein the is distinct from the first type;
   determine a first selected anonymization protocol for the first type of the first data; and
   prior to output of the log file,
   anonymize the first data according to the first selected anonymization protocol as the first data is added to the log file; and
   anonymize, as the second data is added to the log file, the second data according to a second selected anonymization protocol applicable to the second data type, wherein the second selected anonymization protocol utilizes a distinct anonymizing mechanism from the first selected anonymization protocol.

2. The system of claim 1, wherein the first data includes potentially personally identifiable information generated during operation of a computing device.

3. The system of claim 1, wherein the first selected anonymization protocol is an as-is anonymization protocol that does not modify the first data as the first data is added to the log file.

4. The system of claim 1, wherein the first selected anonymization protocol is a hashing protocol that modifies the first data by running the first data through a cryptographic hash function to generate a hash value to substitute for the first data as the first data is added to the log file.

5. The system of claim 1, wherein the first selected anonymization protocol is a tokenizing protocol that modifies the first data by replacing, as the first data is added to the log file, the first data with a randomized string that does not uniquely identify original content of the first data in the log file.

6. The system of claim 1, wherein the first selected anonymization protocol is a redaction protocol that modifies the first data by replacing, as the first data is added to the log file, the first data with a constant string that does not uniquely identify original content of the first data in the log file.

7. The system of claim 1, wherein the first selected anonymization protocol is selected by a user to be assigned to the first type prior to receiving the first type of the first data.

8. A non-transitory machine-readable storage medium comprising instructions executable by a processor to:
- assign a respective anonymization protocol applicable to each data type of a plurality of data types according to a user input;
- determine first data to be added to a log file is of a first particular data type of the plurality of data types;
- determine second data to be added to the log file is of a second particular data type that is distinct from the particular data type; and
- prior to output of the log file,
  - anonymize the first data according to a first anonymization protocol applicable to the first particular data type, as the first data is added to the log file; and
  - anonymize, as the second data is added to the log file, the second data according to a second anonymization protocol applicable to the second data type, wherein the second anonymization protocol utilizes a distinct anonymizing mechanism from the first anonymization protocol.

9. The non-transitory machine-readable storage medium of claim 8, including instructions executable by a processor to present a user with a list of the plurality of data types and, for each individual listed data type, a list of a plurality of distinct anonymization protocols, wherein each anonymization protocol of the listed plurality of distinct anonymization protocols is selectable by the user as the user input.

10. The non-transitory machine-readable storage medium of claim 8, wherein the first particular data type of the first data is assigned to the first data by an application developer associated with an application having generated the first data.

11. The non-transitory machine-readable storage medium of claim 8, wherein the log file includes telemetry data to be transmitted to a remote computing device for analysis.

12. A method, comprising:
- assigning, with a processor, a respective anonymization protocol applicable to each data type of a plurality of data types according to a user input;
- determining, with the processor, data to be added to a log file is of a particular data type of the plurality of data types; and
- prior to outputting the log file by the processor,
  - anonymizing, with the processor, the data according to an anonymization protocol applicable to the data type as the data is added to the log file;
  - scanning, with the processor, the log file to identify non-anonymized data of each data type of a plurality of data types; and
  - anonymizing the identified non-anonymized data according to its respective applicable anonymization protocol.

13. The method of claim 12, responsive to a determination that the anonymizing of the identified non-anonymized data is complete, outputting the log file to an administrator.

* * * * *

UNITED STATES PATENT AND TRADEMARK OFFICE
CERTIFICATE OF CORRECTION

| | |
|---|---|
| PATENT NO. | : 12,086,286 B2 |
| APPLICATION NO. | : 17/768885 |
| DATED | : September 10, 2024 |
| INVENTOR(S) | : Daryl T. Poe |

It is certified that error appears in the above-identified patent and that said Letters Patent is hereby corrected as shown below:

In the Specification

Column 4, Line 9, "QUID" should be --UUID--.

Signed and Sealed this
Twelfth Day of November, 2024

Katherine Kelly Vidal
*Director of the United States Patent and Trademark Office*